United States Patent [19]

Kitko

[11] Patent Number: 5,350,527
[45] Date of Patent: Sep. 27, 1994

[54] OILY WATER SEPARATION AND WATER RECLAMATION SYSTEM

[76] Inventor: John C. Kitko, 6713 Grand Bahama Dr., Tampa, Fla. 33615

[21] Appl. No.: 121,362

[22] Filed: Sep. 14, 1993

[51] Int. Cl.$^5$ .............................................. C02F 1/40
[52] U.S. Cl. ................... 210/804; 210/806; 210/109; 210/259; 210/540; 210/DIG. 5
[58] Field of Search ............... 210/744, 799, 804, 806, 210/109, 258, 259, 521, 532.1, 538, 540, DIG. 5, 694

[56] References Cited

U.S. PATENT DOCUMENTS

| | | | |
|---|---|---|---|
| 3,878,094 | 4/1975 | Conley et al. | 210/DIG. 5 |
| 3,965,004 | 6/1976 | Garber | 210/259 |
| 3,977,975 | 8/1976 | Geurtsen | 210/540 |
| 3,992,297 | 11/1976 | Baughcom et al. | 210/540 |
| 4,139,463 | 2/1979 | Murphy et al. | 210/DIG. 5 |
| 4,151,087 | 4/1979 | Sakagachi | 210/540 |
| 4,315,822 | 2/1982 | Jaisinghani | 210/259 |
| 4,608,160 | 8/1986 | Zorh | 210/540 |
| 5,143,611 | 9/1992 | Orte, Jr. | 210/259 |

Primary Examiner—Christopher Upton
Attorney, Agent, or Firm—Dominik, Stein, Saccocio, Reese, Colitz & VanDerWall

[57] ABSTRACT

A system and a process for separating impurities such as grease, fuels and solid particulate matter, from water contaminated therewith, comprising passing the water to be treated through a first cleanable strainer bag assembly for filtering solids, a holding/settling tank for separation of an oily and water phase and for precipitation of solids, a second cleanable strainer bag assembly having at least one strainer bag of a porosity finer than the porosity of the strainer bag of said first cleanable strainer bag assembly, a heavy oil gravity separator, a light oil coalescer, a further oil and petrochemical and very fine solid separator with a replaceable polypropylene element for adsorbing or absorbing oil and filtering solids, and preferably also a carbon filter assembly. The invention makes possible the economical removal of impurities and the reclaiming of water with a residual impurities level of less than 5 parts per million. The invention is particularly suitable for reclamation of water in an industrial environment.

18 Claims, 1 Drawing Sheet

OILY WATER SEPARATION AND WATER RECLAMATION SYSTEM

FIELD OF THE INVENTION

The present invention concerns a system and a process for the near complete removal of oily components, fine particulate matter, and other water contaminating substances such as chemicals, organics, fertilizers, solvents, emulsified degreasers and odors from waste water so that the water may be discharged into the environment or reused in a closed loop zero discharge operation such as a pressure cleaning operation. The reclaimed water has a residual petrochemical impurities level of less than 5 parts per million. The invention is particularly suitable for recitation of water in an industrial environment.

DESCRIPTION OF THE RELATED ART

It is conventional to use water under pressure to clean and degrease heavy equipment. There is, however, an increasing awareness for the need to protect the environment from sources of pollution such as the oily-water run-off from pressurized water cleaning operations. Reclaiming water following such equipment cleaning operations is difficult due to the difficulty of completely removing fine solids and emulsified oils from the water. A number of systems for treatment of oily water have been proposed, but none have proven successful in practice as means for the near complete removal of solid and oily phases on an industrial scale and in an industrial setting.

For example, U.S. Pat. No. 3,992,297 (Baughcom, et. al.) teaches an oil separator which is particularly suited as a bilge oil separating system since it is not affected by a ship's pitch and roll. Separation means include a splatter chamber, a diffuser, gravitational separation, weep holes, slanting reverse flow cheers, etc. The Receiver chamber filters solid particles by means of a plurality of screens from coarse screen to fine screen. However, in practice, this system involves too many pumps, switches and moving parts, the equipment is too complex for practical everyday use and maintenance, the oil-separation methods appear to be crude, and the purity of the resulting water does not appear to be very high.

U.S. Pat. No. 3,977,975 (Geursten) teaches separation of a mixture of liquids by the use of a series of filters (filtering cloths) designed to let through almost exclusively the heavier liquid (i.e., water). Apparently, fine particles of mud and dirt may pass through the filters (column 4, line 22).

U.S. Pat. No. 4,151,087 (Sakaguchi) teaches a gravity-type single vessel oil-water separator which is illustrated in FIG. 2. A cylindrical filter element, having an upper and a lower section, is constructed of an oleophilic material such as polypropylene. Apparently, small oil particles which pass through the filter from the outside are coalesced in the filter to form larger oil particles which have a greater tendency to rise once inside the cylinder, whereby the removal of small oil particle from the water is facilitated. However, in this system, a pump is provided upstream of the oily water separator. The pump causes the oil/water mixture to be pushed to the separator in an agitated, thoroughly mixed state, greatly reducing the efficiency of the gravity separator. Further, Sakaguchi does not address the problem of separation of solid particulate matter which may be present in the contaminated water. If provisions are not made for the effective removal of any solids which may be present, the system will clog, raising the costs of operation in terms of down time, labor and replacement filters. Further, due to the enclosed nature of the filter, servicing of the system does not appear to be simple. Finally, no provision is made for absorption of microscopic oil and grease particles.

U.S. Pat. No. 4,139,463 (Murphy et. al.) teaches a water separation system primarily for shipboard use and comprising a first filter stage, a separator stage, a pump, a coalescing filter stage, and a final or polishing filter stage. However, this system has proven inefficient in practice, and a high degree of impurities removal can not be achieved. A problem which becomes significant in practice with this system, which operates on vacuum to pull fluid into the system, is that any leak will cause performance problems—loss of vacuum and contamination with air—which may lead to pump failure and loss of operational time. Finally, the frequent 90 degree bends in the plumbing system act as an agitator, mixing oil and water and making separation more difficult.

U.S. Pat. No. 4,608,160 (Zoch), in FIG. 1, shows a first stage heavy oil gravity separator and second stage light oil coalescer. Zoch is concerned with the gravity separator, and more specifically, a gravity separator having a flat inclined baffle plate. Water is directed upwardly across the baffle so that the larger oil droplets will separate from the water and collect as a layer in the upper end of the separator tank, while the effluent is discharged from the bottom of the tank and pumped to a coalescer unit. In the coalescer, water is introduced into the interior of a coalescer element and flows outwardly, with residual oil droplets collecting on the outer surface of the element and coalescing to form larger droplets which will release from the element and be collected in the upper end of the coalescer tank. In practice, however, this system is not capable of treating waste water containing fine particulate solids and is not capable of the near complete separation of oil and fine solids from water on an industrial scale.

U.S. Pat. No. 5,143,611 (Pate, Jr.) teaches an apparatus for the separation of oil and water comprising a large tank having turbulence free primary and secondary separation chambers which separates the oil from the water by a two-phase gravity separation. An external active carbon filter provides a third phase of oil and water separation to yield clean, sheen-free water having less than 15 ppm of oil. This apparatus is specifically designed for purifying oily air-conditioning condensates so that the water may be discharged to the environment, and is not adapted to handling larger volumes of water, particularly water containing fine solids.

None of the above systems are capable of satisfying the need in industry of reclaiming water containing oil and dirt and possibly other contaminants, such as water run-off from pressure washing and cleaning greasy, oily, dirty equipment.

SUMMARY OF THE INVENTION

An object of the invention is to provide a system capable of the near complete removal of oily components such as oil, grease and fuel from waste water so that the water may be discharged into the environment or reused in a closed loop zero discharge operation.

A further object of the invention is to provide a system capable of the near complete removal of other water contaminating substances such as fine particulate solids, chemicals, organics, fertilizers, solvents, emulsified degreasers and odors from water.

A further object of the invention is to make possible the reclaiming of waste water produced in pressure cleaning operations so that so that the water may be discharged into the environment or reused in a closed loop zero discharge operation.

A yet further object of the invention is to make possible the reclaiming of water with a residual petrochemical impurities level of less than 5 parts per million.

Yet another object of the invention is to provide a system capable of being efficiently and economically operated in an industrial setting.

After extensive investigation and experimentation, the present inventor has discovered that the objects of the invention can be accomplished by a system for separating immiscible fluids having different densities, such as oil and water, said system comprising:

(a) a first filter assembly comprising a filter housing and a porous filter, said housing having an inlet for receiving a mixture of immiscible fluids and an outlet for discharging filtered fluids, said filter preferably being in the forth of a strainer bag preferably having a porosity of 1–100 $\mu$m, more preferably 10–50 $\mu$m, and most preferably about 25 $\mu$m;

(b) means for introducing a mixture of immiscible fluids into said inlet of said first filter assembly;

(c) a settling tank for quiescently containing a rolls of immiscible fluids of different densities for allowing lighter fluid(s) to rise for removal and heavier fluids to settle for removal;

(d) means for withdrawing filtered fluids from said outlet of said first filter assembly and communicating said fluids to said settling tank;

(e) a second filter assembly comprising a filter housing and a filter, said filter housing having an inlet and an outlet, the porosity of said filter of said second filter assembly being finer than the porosity of the filter of the first filter assembly, said porosity preferably being 1–25 $\mu$m, more preferably 10 $\mu$m;

(f) means for withdrawing settled heavier fluids from said settling tank and communicating said heavier fluids to said inlet of said second filter assembly;

(g) a heavy oil gravity separator including a heavy oil gravity separator housing having an inlet, an outlet for relatively heavier fluid, an outlet for relatively lighter fluid(s), and baffled separator means disposed in the interior of said separator for deflecting the flow of immiscible fluids communicated to said separator whereby the relatively heavier fluid communicated to said separator separates from the relatively lighter fluid(s) concurrently communicated thereto to form a layered mixture of heavier and lighter fluids;

(h) means for withdrawing filtered fluids from said outlet of said second filter assembly and communicating said fluids to said inlet of said heavy oil gravity separator, (i) a light oil coalescer for separation of fluids into a heavier fluid and lighter fluid(s) comprising a coalescer housing having an upper end and a lower end and a coalescer element, said coalescer housing having an inlet, an outlet in communication with said separated heavier fluids, and an outlet in communication with said separated lighter fluids;

(J) means for withdrawing said separated relatively heavier fluid from said outlet of said heavy oil gravity separator and communicating said relatively heavier fluid to said inlet of said light oil coalescer;

(k) means for periodically withdrawing separated lighter fluids from said light oil coalescer;

(l) an oil separator comprising a separator housing and a separator element, preferably a replaceable polypropylene element, for adsorbing oil and filtering solids, said separator housing having an inlet on the upstream side of said replaceable element and an outlet on the downstream side of said replaceable element;

(m) means for communicating said separated heavier fluids from said light oil coalescer to said oil separator.

The objects of the invention are also accomplished by a process for separating oil and water which process comprises, in order:

(a) supplying a mixture of oil and water to a first strainer bag assembly including at least one porous strainer bag;

(b) passing said mixture through at least one porous strainer bag in said first strainer bag assembly;

(c) conveying the mixture treated in step (b) to a settling tank and allowing a fraction of the oil to rise to the top of the tank, a fraction of any solid particulate matter present to settle to the bottom of the tank, and a predominantly water fraction to form in the remainder of the tank;

(d) withdrawing some of the predominantly water fraction obtained in step (c) from said settling tank, conveying it to a second cleanable strainer bag assembly, and passing it through at least one strainer bag in the second strainer bag assembly of a porosity finer than the porosity of the strainer bag of said first cleanable strainer bag assembly;

(e) conveying the product of step (d) to a hearty oil gravity separator for causing oil to separate and rise to the top of the heavy oil gravity separator, and withdrawing oil from the top of the heavy oil gravity separator;

(f) withdrawing fluids from a lower portion of said heavy oil gravity separator and conveying the withdrawn% fluids to a light oil coalescer having an element for adsorbing oil and filtering solids to form an oil-rich phase in the upper portion of the light oil coalescer and a water-rich phase in the remainder of the light oil coalescer;

(g) withdrawing oil-rich fluid from the upper portion of the light oil coalescer;

(h) withdrawing water-rich fluid from the light oil coalescer and conveying it to a further oil separator having a filter element for filtering solids and absorbing oil in the filter element; and (i) conveying the water-rich fluid treated in step (h) to a carbon filter assembly and passing the water rich fluid through the carbon filter.

In a preferred embodiment, the first filter element is a duplex cleanable strainer bag housing, each housing containing at least one strainer bag, preferably having a porosity of 25 $\mu$m.

No industrial system integrates components which cooperate with each other and complement each other in such a manner that the level of water purity is unexpectedly greater while the operating costs are unexpectedly reduced.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other marking devices for carrying out the same purposes of the present invention. It should also be realized by those skilled in the art that such equivalent structures do not depart from the spirit and scope of the invention as set forth in the appended claims.

BRIEF DESCRIPTION OF THE DRAWING

For a fuller understanding of the nature and objects of the present invention reference should be made the following detailed description taken in with the accompanying drawings in which.

DESCRIPTION OF THE PREFERRED EMBODIMENTS

Figure 1:
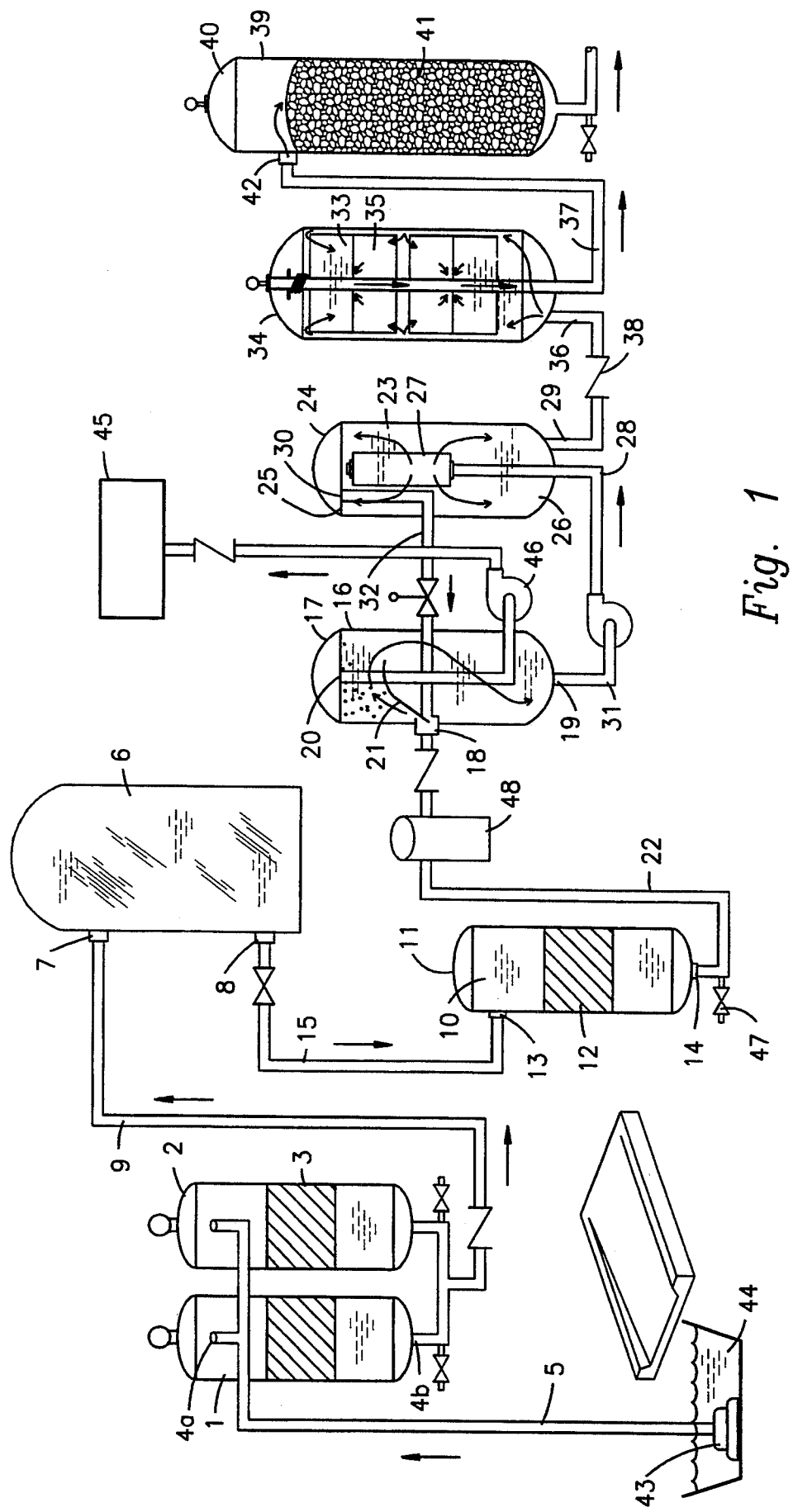
FIG. 1 is a schematic illustration of a preferred embodiment of the oily-water separation and water reclamation system of the present invention.

Certainly, a great variety of pumps, filters, and gravity separators are available for processing of oily or otherwise contaminated water. However, no system has yet been devised which is capable of economically reclaiming water on an industrial scale to the high degree of purity as made possible by the present invention.

When considering the advantages of the invention, the oily water separation and reclamation system of the present invention far exceeds any existing system. It is a totally new system capable of separating impurities, chiefly oil, grease, fuels and fine solids, from water to a residual level measured in parts per million.

The term "impurities" as used herein is intended to refer to any oily matter which would be considered a pollutant if allowed to enter the environment. The term "parts per million" as used herein is intended to refer to parts by weight of the measured impurity to parts by weight of water. The term "heavy oil" as used herein is intended to mean either a heavier concentration of oil in water, or the presence of what is referred to in the industry as a heavy oil, i.e., "heavy weight oil." The term "light oil" as used herein is intended to mean either a lighter concentration of oil in water, or the presence of what is referred to in the industry as "light weight oil."

The term "industrial" is intended to mean that the system must be capable of recycling hundreds of gallons per day at an economical cost in terms of level of skill or training of operator, time required for servicing and repair, and replacement items such as filters.

The most difficult problem in reclaiming waste water run-off from pressure washing and cleaning greasy, oily, dirty equipment is removing solids and emulsified, dissolved oils completely from the water. The system according to the present invention addresses this problem by first removing 90% of all solids before the water enters the stages of the system specifically designed for oily water separation and removal, beginning with the heavy-oil gravity separator. The solids are preferably removed by a series of cleanable filter/strainer bags and a vertical holding/settling tank. These cleanable filter/strainer assemblies are preferably equipped with pressure gages or vacuum gages which make it possible to determine whether the filters are dirty and need to be serviced. The problem with most oily water separators and water reclamation systems is that the system is quickly overloaded with dirt, metals, organics and other solids which make the system require constant maintenance and hinders the total effectiveness of the oily water separation process.

In accordance with the present invention, by addressing the solids removal problem before the problem of complete removal of free floating oils and emulsified or dissolved petro-chemicals, solids removal requires little time and is very inexpensive to achieve. Removing these solids effectively also greatly increases system efficiency and filter element life to keep maintenance time and expense to a minimum. The present invention makes is possible to easily achieve an impurities content of 5 ppm or less while operating at process rates more than adequate to reclaim enough water to keep up with any pressure washing needs.

In accordance with the present invention, a system is provided for separating immiscible fluids having different densities, such as oil and water, said system comprising:

(a) a first filter assembly 1 comprising a filter housing 2 and a porous filter 3, said housing having an inlet for receiving a mixture of immiscible fluids and an outlet 4 for discharging filtered fluids, said filter 3 preferably being in the form of a strainer bag preferably having a porosity of 1–100 $\mu$m, more preferably 10–50 $\mu$m, and most preferably about 25 $\mu$m;

(b) means 5 for introducing a mixture of immiscible fluids into said inlet of said first filter assembly such as PVC piping, copper piping, stainless steel piping, or any conduit means employed in the art;

(c) a settling tank 6 for quiescently containing a volume of immiscible fluids of different densities for allowing lighter fluid(s) to rise for removal and heavier fluids to settle for removal, said settling tank having an inlet 7 and an outlet 8;

(d) means 9 for withdrawing filtered fluids from said outlet of said first filter assembly 1 and communicating said fluids to said settling tank;

(e) a second filter assembly 10 comprising a filter housing 11 and a filter 12, said filter housing having an inlet 13 and an outlet 14, the porosity of said filter 12 of said second filter assembly being finer than the porosity of the filter 3 of the first filter assembly, said porosity preferably being 1–25 $\mu$m, more preferably about 10 $\mu$m;

(f) means 15 for withdrawing settled heavier fluids from said settling tank 6 and communicating said heavier fluids to said inlet 13 of said second filter assembly;

(g) a heavy-y oil gravity separator 16 including a heavy oil gravity separator housing 17 having an inlet 18, an outlet for relatively heavier fluid 19, an outlet for relatively lighter fluid(s) 20, and baffled separator means 21 disposed in the interior of said separator for deflecting the flow of immiscible fluids communicated to said separator whereby the relatively heavier fluid communicated to said separator separates from the relatively lighter fluid(s) concurrently communicated thereto to form a layered mixture of heavier and lighter fluids;

(h) means 22 for withdrawing filtered fluids from said outlet 14 of said second filter assembly 10 and communicating said fluids to said inlet 18 of said heavy-y oil gravity separator 16, (i) a light oil coalescer 23 for separation of fluids into a heavier fluid and lighter fluid(s) comprising a coalescer housing 24 having an upper end 25 and a lower end 26 and a coalescer element 27, said coalescer housing 24 having an inlet 28, an outlet in communication with said separated heavier fluids 29, and an outlet in communication with said separated lighter fluids (j) means 31 for withdrawing said separated relatively heavier fluid from said outlet 19 of said heavy oil gravity separator and communicating said relatively heavier fluid to said inlet 28 of said light oil coalescer 23;

(k) means 32 for periodically withdrawing separated lighter fluids from said light oil coalescer 23;

(l) an oil separator 33 comprising a separator housing 34 and a separator element 35, preferably a replaceable polypropylene element, for adsorbing oil and filtering solids, said separator housing 34 having an inlet 36 on the upstream side of said replaceable element and an outlet 37 on the downstream side of said replaceable element;

(m) means 38 for communicating said separated heavier fluids from said light oil coalescer to said oil separator, The system preferably further comprises a carbon filter assembly 39 comprising a carbon filter assembly housing 40 and a carbon filter 41, said carbon filter assembly housing having an inlet 42 in communication said outlet 37 of said oil separator 33.

The operation of the system will now be explained in greater detail with reference to the preferred embodiment as illustrated schematically in FIG. 1.

The preferred embodiment according to the present invention has no open sumps or vessels to expose process water to people or the atmosphere, and no moving parts except for two (2) pump impellets and motor shafts. Gauges are present on every vessel to pinpoint service requirements and to indicate system performance, and the collected oils are automatically detected and pumped off to a designated disposal container. The system is built for endurance under industrial conditions, is very easily installed and delivers very dependable service and performance.

The sump pump 43 pumps water to be treated out of a collection reservoir 44, sump or tank through the duplex cleanable strainer bag housing assembly 1 and into the vertical holding/settling tank 6. The submersible sump pump is preferably a pump that will withstand 140° F. temperature, and be resistant to oil and chemicals. Preferred among these is a pump of plastic and aluminum construction with an on-off floatation switch. An example of such sump pumps are those manufactured by Little Giant Pumps, Model #8-ClM, and available from Grainger in Tampa, Fla. & Depco Pumps in Clearwater, Fla.

The first, preferably duplex, cleanable strainer bag assembly 1 is used in the first stage of solids removal. Solids are filtered out of water pumped by the sump pump 43 prior to entering the holding/settling tank 6. The use of such a first strainer bag assembly greatly extends life of replacement elements for the oily water separation system. Twin filter bag housings are preferably manifolded together with brass ball valves for the capability of continuing operation of the system using only one of the two single housings while isolating and cleaning or servicing the other. When not necessary to clean or service the first filter assembly, both filter bags are preferably used simultaneously.

The filter bags in the first strainer bag assembly are preferably standard 25 micron cleanable filter bags, but can be any of 1–300 micron cleanable bags depending on the nature of the solid particulate matter to be filtered. Such bags are distributed by Filmax, Inc. in Knoxville, Tenn. The complete first filter assembly unit is preferably skid mounted and provided with stainless steel liquid filled dirty filter gauges and wash out valves for thorough, easy servicing. For example, when the pressure or pressure differential gauge reads 12–15 PSI or above, the filter bags should be cleaned and replaced. In practice, it has been found to be most practical to use filter bag assemblies where each single housing has a maximum flow rate of 40 GPM, with 80 GPM being the maximum flow when two housings are in service. These housings are preferably constructed of steel in the shape of cylinders with a powder baked finish. Such canisters are manufactured by Filmax, Inc. in Knoxville, Tenn, and available as Part #B-1000. They have an o-ring sealed lid which is secured by a stainless steel T-bolt "V" clamp assembly. Inside each of these cylinders is a cylinder shaped perforated basket, each basket housing a cleanable filter bag. The cleanable filter bag is placed into the basket and seals itself to the basket at the top. These filter bags may be planar or corrugated, and are preferably greatly oversized in terms of flow rate to accommodate large quantities of solid particles so servicing requirements are less frequent.

The duplex-type cleanable strainer bag assembly is used in a preferred embodiment of the invention, but any type of filter capable of filtering fine solids may be used. For example, any conventional pool filter may be used inplace of the duplex filter. The filter is preferably a pleated polyester cartridge type filter and may be, for example a filter with tradename "Ametek", part no. 2HFBB20PR, produced by Plymouth Products Division.

The settling tank 6 is preferably translucent and constructed of polyethylene, with a removable cover lid, an inlet 7, an outlet 8, and a drain 46—female pipe thread. The tank preferably sits on a tank stand made of primed and painted concrete and exterior plywood bolted together. The tank is cylindrical in shape and is equipped with a large bottom mounted wash out valve. The tank stand is round. Suitable settling tanks are manufactured by Chemical Containers in Lake Wales, Fla. The tank is elevated relative to the second, downstream strainer bag housing to provide a positive pressure, flooded fluid source for the entrance of the second strainer bag housing 11 and for the heavy oil gravity separator 16 to prevent problems associated with vacuum leaks. The tank 6 also provides for excellent settlement of solids and separation of the two fluids (oil and water) after the mixture had been thoroughly combined due to being rapidly pumped under pressure through the sump pump 43.

The second strainer bag housing assembly 11 preferably houses a bag 12 of 10 micron porosity for the third and final stage in solids removal prior to entering oily water separation stages. The housing is preferably a cylinder constructed of steel with a powder baked finish. Such cylinders are manufactured by Filmax, Inc. in Knoxville, Tenn, and available as Part #B-1000. Such a cylinder has an o-ring sealed lid which is secured by a stainless steel T-bolt "V" clamp assembly. Inside of this cylinder is preferably provided a perforated cylinder shaped basket assembly with holes in it which houses a cleanable filter bag. The cleanable filter bag is placed into the basket and seals itself to the basket at the top. This filter bag is greatly oversized in terms of flow rate to accommodate large quantities of solid particles so servicing is infrequent. The housing assembly is equipped with a bottom wash out valve 47 for thorough and easy servicing.

A cleanable safety strainer/sight glass 48 is preferably provided between the second strainer bag assembly and the heavy-oil gravity separator. A small cleanable 100 mesh stainless steel screen is provided in a see-through bowl for viewing water prior to entering oily water separation stages. The strainer/sight glass is made of plastics, is cylinder shaped, and has a threaded bowl that is removable for screen cleaning.

After leaving the second strainer assembly 10, the solids-free oily water enters the first stage heavy oil gravity separator where free floating oils may accumulate on the top where they can be automatically detected and pumped by pump 46 into a waste oil slop tank 45. The heavy oil gravity separator 16 may be any of those used in the industry, but particularly preferred for reasons of cost, ease of servicing, and ease of operation are those described in U.S. Pat. No. 4,608,160. Also preferred are gravity separators as disclosed in U.S. Pat. No. 5,073,266. The heavy oil gravity separator further comprises an oil detecting means for detecting the accumulation of a predetermined amount of oil in the upper portion of the cheer to provide an electrical signal and means responsive to said electric signal to control an electromagnetic valve to allow discharge of the oil therethrough, or to control an electric pump to cause withdrawal of the oil until the amount of oil is reduce to a predetermined minimum.

The fluid continues to the coalescer stage 23 of oil removal where tiny droplets of oil accumulate, collect or coalesce to form larger droplets which when large enough, float to the surface of the coalescer housing. A vacuum tube 32 is situated at the top of the coalescer housing which continually sucks the floating oils back to the gravity separator 16 where they will eventually be pumped into the waste oil slop tank 45 with the other free-floating oils. Also in this coalescing stage is a fine solids filter which adds to water clarity and removes the solids to which oils and petro-chemicals attach themselves.

The light oil coalescer with the replaceable element may be any of those employed in the industry, but preferred are those as disclosed in U.S. Pat. No. 4,608,160. A combined gravity separator and coalescer with element stages with controls, pumps and motors is manufactured by Nelson Industries in Stoughton Wis., and available as Model #10025, Part #96504A and Model 10075, Part #96609-A.

After leaving the light oil coalescer, the heavier fluid, which is usually water, is passed to an oil absorption and very fine solids removing stage 33. This stage absorbs any remaining free and emulsified oils and petrochemicals and removes solids down to the 1–3 micron range. This stage is a critical stage in the process because it removes the microscopic solid particles which can contain oils as well as microscopic organics and oils. This stage is the "polishing" stage in solids and oil removal and greatly improves water clarity. This stage also removes heavy metals. This is important to the extension of pressure washing equipment life and reduces maintenance and repair of pressure washing system components. This stage has a replaceable element, and is the third stage of oil removal. Such a housing (Part #MS-1012) and element (Part #W6-4059) are manufactured by Filmax, Inc. in Knoxville, Tenn. The filter element is preferably one with a high surface area. The microscopic emulsified petro-chemicals dispersed in the water that cannot be removed by gravity because they do not float are removed in this stage of oil removal. Because degreasers, soaps and high pressures during pressure washing are commonly used, many of the petro-chemicals which violate State Department of Environmental Regulation and Health and Rehabilitative Services regulations are not found on the surface, but are mixed up or emulsified in the water they contaminate. The absorption stage of oil removal absorbs such petro-chemicals and does not allow any oils to pass through this one micron oil absorbing media. Also, any solids over 1–3 microns in size do not pass either. This stage greatly helps improve water clarity. This unit is made of stainless steel and is a cylinder shaped vessel.

In a preferred embodiment, process water enters through an offset threaded hole on the bottom of the vessel, passes through a very tightly wound rolled polypropylene filter media from the "outside" in, then passes through a filter, through a flow controlled orifice assembly (which also acts as a filter securing assembly), then into a center tube to finally exit through a center threaded hole on the bottom of the vessel. A bottom wash out valve is included for thorough and easy servicing.

The final stage of water treatment is the activated carbon filter assembly 39 which is filled with virgin activated carbon 41 which removes odors, chemicals, organics, heavy metals and any remaining petro-chemicals. Any impurities which were not removed in the other previous stages are very effectively absorbed and removed at this stage. The activated carbon filter assembly is a very large skid mounted filter vessel assembly with a specialized blend of virgin activated carbon which provides optimum removal of chemicals, odors, organics, petro-chemicals, solvents and emulsified degreasers. This unit also greatly improves clarity of processed water and is added assurance that all petro-chemicals are absent. The unit is complete with a flow restriction gauge.

This housing for the carbon filter assembly is a cylindrical shaped steel vessel with a powder baked finish. It has an o-ring sealed lid which is secured by a stainless steel T-bolt "V" clamp assembly. Inside of this cylinder is a dispersion plate and a cylinder shaped basket assembly with perforations which basket houses a cleanable filter bag. The cleanable filter bag holds the activated virgin carbon and, when placed into the basket, seals itself to the basket at the top. After the process fluid enters the vessel at the top on the side, the water passes the entire length of the vessel through the carbon and exits on the bottom center through a threaded hole. A bottom wash out valve is included for thorough and easy servicing. This carbon filter assembly is available from Filmax, Inc. of Knoxville, Tenn. as Part B-2000. This stage of waste water processing is very important to water clarity, odor removal and chemical removal and is the last stage of water treatment before it enters the reclaimed water holding/storage tank. If the reclaimed waste water is to be reused in a zero discharge pressure cleaning situation, it must be super clean and safe for the equipment and the personnel using the equipment. Personal safety of the operator should be carefully considered: no one should have to breathe in hazardous, polluted water while they are at work pressure cleaning equipment. The inventive system offers the highest degree of water purity, simple low-cost and infrequent servicing and is very competitively priced.

After the final stage of water cleaning is complete (i.e. the activated carbon filter stage), the water is then discharged into a holding/storage tank where the water may be chemically treated and aerated to be kept fresh and clean for reuse in the pressure washer which begins the entire cycle again. Such a vessel is manufactured by Filmax, Inc., with activated carbon available from Calgon Carbon, and dispersion plate manufactured by Refining Systems of Florida, Inc. and available as Part #B-2000.

This entire system is designed to be a zero discharge system in which the water is contained, processed and reused over and over again. When too much water is accumulated and processed, excess water may be discharged into the environment legally since the level of oily impurities is less than 5 parts per million, meeting present government mandated levels.

Mounting frames, tank stands, brackets and skids are available from Refining Systems of Florida, Inc.

The system can be monitored and operated manually, or can be controlled electronically with the following controls:

1. Sump pump low level shutdown: When the sump is pumped down to the desired level, the sump pump will not engage. When the sump liquid level rises to a point where it is desirable to engage the pump, a switch is caused to come to the on position and energize the sump pump.

2. Liquid level control in settling tank—Upper level: When the settling tank is full, a floatation switch cuts power to the sump pump. When the tank is below a predetermined level the power interrupt to the sump pump is disengaged and the sump pump may resume pumping.

3. Liquid level control in tank—Low level: When the tank is down to desired low level, a switch cuts power to the oily water separation system's pumps so as to not pump air or run dry and damage pumps.

4. Timer: An electrical timer may be utilized on the main and oil pumps on the oily water separator to allow for "batch" processing of tanks of oily water so as to allow time between "batches" for separation of oil and water and settlement of solid contaminants.

5. Liquid level control for processed water holding/storage tank: When tank is full switch cuts power to main and oil pumps on the oily water separator to prevent tank from overflowing.

The system according to the present invention may also be provided with a system for aerating water which is allowed to accumulate in the sump. This is desirable since sump water, if allowed to become stagnant, grows bacteria, and begins to emit an unpleasant odor. To prevent such a problem, the sump pump may be utilized to continually pump water from the sump through the filter assembly to the settling tank which is equipped with an overflow pipe that allows the water to "rain" back to the sump through holes in the pipe, thus moving and aerating the sump water keeping it as fresh as possible.

Accordingly, the system of the present invention for the separation of immiscible fluids having differing densities including a relatively heavier fluid immiscible in the lighter fluid(s), and optionally fine solid matter, may be constituted by assembling the above described equipment, and more particularly, by the arrangement of:

first elongated enclosed volume means having an upper end and a lower end and its axis of elongation vertically oriented for containing a volume of immiscible fluids and having disposed therein a first basket having perforations and an upper rim and a bottom, and said first basket having disposed therein a first filter, said upper rim of said first basket in association with said first elongated enclosed volume means to cause the basket to define in said first elongated enclosed volume means an upper volume and a lower volume;

first conduit means for coupling a source of immiscible fluids with said first elongated enclosed volume means above the upper rim of said basket;

second elongated enclosed volume means having its axis of elongation vertically oriented and having an upper end and a lower end, said second enclosed volume means for containing a volume of immiscible fluids greater than the volume of said first volume means and having an inlet intermediate the upper and lower ends, withdrawal means for withdrawing the separated lighter fluids continuously or periodically from the upper portion of the second elongated enclosed volume means, and outlet means for withdrawing separated hearer fluids from the lower portion of said second elongated enclosed volume means, second conduit means for connecting the first elongated enclosed volume means at a point below said upper rim of said first basket and said inlet of said second elongated enclosed volume means;

third elongated enclosed volume means having an upper end and a lower end, its axis of elongation vertically oriented for containing a volume of immiscible fluids, and having disposed therein a second basket having perforations and an upper rim and a bottom, and said second basket having disposed therein a second filter, said upper rim of said second basket in association with said third elongated enclosed volume means to cause the second basket to define in said third elongated enclosed volume means an upper volume and a lower volume, and an inlet above said upper rim of said basket and an outlet below said upper rim of said basket;

third conduit means for connecting the outlet of said second elongated enclosed volume means and said inlet of said third elongated enclosed volume means;

fourth elongated enclosed volume means having an upper end and a lower end and its axis of elongation vertically oriented for containing a volume of immiscible fluids and having inlet means intermediate the upper end and lower end;

fourth conduit means for connecting the outlet of said third elongated enclosed volume means and said inlet of said fourth elongated enclosed volume means;

baffled separator means disposed in the interior of said fourth elongated enclosed volume means for deflecting the flow of immiscible fluids communicated to said fourth elongated enclosed volume means through said fourth conduit means whereby the relatively heavier fluid communicated to said fourth enclosed volume means separates from the relatively lighter fluid(s) concurrently communicated thereto to from a layered mixture of heavier and lighter fluids;

withdrawal means for withdrawing said relatively lighter fluid(s) from the upper portion of said fourth volume means;

pump means downstream of said fourth enclosed volume means for withdrawing said relatively heavier fluid from the lower portion of said fourth elongated enclosed volume means so that additional relatively unemulsified immiscible fluids are communicated by suction into said first elongated enclosed volume means through said first conduit means;

fifth conduit means for communicating the withdrawn fluid under vacuum created by said pump means from said outlet of said fifth elongated enclosed volume means to said pump means;

fifth elongated enclosed volume means having an upper end and a lower end and its axis of elongation vertically oriented for containing a volume of immiscible fluids and having inlet means sixth conduit means for communicating the withdrawn fluid under pressure created by said pump means from said pump means to said inlet of said fifth elongated enclosed volume means;

coalescing means disposed in said fifth elongated enclosed volume for coalescing the lighter fluids in said fifth elongated enclosed volume to allow additional separation of said immiscible fluids;

manifold means for communicating the fluid withdrawn from the upper portion of said fifth elongated enclosed volume means to the fourth elongated enclosed volume means intermediate the upper and lower ends thereof;

sixth elongated enclosed volume means having an upper end and a lower end and its axis of elongation vertically oriented for containing a volume of immiscible fluids and containing a filter element for absorption of oil and removal of solids, and having inlet means on one side of said filter element and an outlet on the other side of said filter element, seventh conduit means for withdrawing heavier fluid relatively free of lighter fluids from the lower portion of said fifth elongated enclosed volume means and conveying said withdrawn fluids to an inlet of said sixth elongated enclosed volume means;

seventh elongated enclosed volume means having an upper end and a lower end and its axis of elongation vertically oriented for containing a volume of immiscible fluids and having inlet means, an outlet means, and an activated carbon filter assembly for absorption of oil and removal of solids between said inlet means and said outlet means, and eighth conduit means for communication between said outlet of said sixth elongated enclosed volume means and said inlet of said seventh elongated enclosed volume means.

The system may be operated by:

(a) supplying oily water to a first cleanable strainer bag assembly, preferably by means of a sump and sump pump, (b) passing said oily water through at least one strainer bag in said first cleanable strainer bag assembly, said strainer bag preferably having a porosity of 1–100 82 m, more preferably 10–50 and most preferably about 25 $\mu$m porosity, (c) conveying the oily water treated in step (b) to a holding/settling tank and allowing at least some of the oil to rise to the top of the tank and some solid particulate matter present in the oily water, if any, to settle to the bottom of the tank, (d) withdrawing oily water treated in step (c) and conveying it, without the oil or solid particulate matter which had been separated in step (c), to a second cleanable strainer bag assembly and passing the treated oily water through at least one strainer bag in the second strainer bag assembly of a porosity finer than the porosity of the strainer bag of said first cleanable strainer bag assembly, said porosity preferably being 1–25 $\mu$m, more (e) conveying the oily water treated in step (d) to a heavy oil gravity separator and separating at least part of the oil from the oily water to produce further treated oily water, (f) conveying the further treated oily water from step (e) to a light oil coalescer, preferably having a replaceable element therein, said replaceable element preferably being a polypropylene element, for adsorbing and/or absorbing oil and filtering solids, and further separating oil from said further treated oily water to form an oil-rich phase in the upper portion of the light oil coalescer and a water rich phase in the remainder of the light oil coalescer, (g) withdrawing fluid from the upper portion of the light oil coalescer, and conveying said withdrawn fluid to a holding tank, to a sump, to said first cleanable strainer bag assembly, or, preferably, to an inlet of said heavy oil gravity separator, (h) withdrawing water rich fluid from the light oil coalescer and conveying it to a further oil separator with a replaceable polypropylene element and filtering solids and adsorbing oil in the polypropylene element, (i) conveying the water rich fluid treated in step (h) to a carbon filter assembly, preferably containing activated carbon, and passing the water through the carbon filter to remove fine particulate matter and fine solids.

In a further preferred embodiment, the system of the present invention for the separation of immiscible fluids having differing densities including a relatively heavier fluid immiscible in lighter fluid(s), and optionally fine solid matter, may comprise:

a first elongated filter means having an upper end and a lower end and its axis of elongation vertically oriented and having disposed therein a first filter having an upstream side and a downstream side;

means for introducing a source of immiscible fluids into said elongated filter means on the upstream side of said first filter;

an elongated settling tank having its axis of elongation vertically oriented and having an upper end and a lower end, and an inlet intermediate said upper end and said lower end, said settling tank for quiescently containing a volume of immiscible fluids of different densities whereby the lighter fluid(s) tend to rise in said tank and said heavier fluid tends to settle in said tank;

means for withdrawing fluids from said first filter means downstream from said first filter and introducing said fluids into said settling tank;

means for withdrawing fluids from the upper portion of said settling tank, a second filter means having an upper end and a lower end, its axis of elongation vertically oriented, and having disposed therein second filter, said second filter having an upstream side and a downstream side and having a finer porosity than said first filter;

means for withdrawing hearer fluids from said settling tank and conveying said heavier fluids to said second filter means on the upstream side of said second filter;

elongated container means having an upper end and a lower end and its axis of elongation vertically oriented for containing a volume of immiscible fluids and having inlet means intermediate the upper end and lower end;

baffled separator means disposed in the interior of said container means for deflecting the flow of immiscible fluids communicated to said container means whereby the relatively heavier fluid communicated to said container means separates from the relatively lighter fluid(s) concurrently communicated thereto to form a layered mixture of heavier and lighter fluids;

means for withdrawing fluids from said second filter means on the downstream side of said second filter and conveying said fluids to said container means;

means for withdrawing said relatively lighter fluid(s) from the upper portion of said container means;

enclosed coalescer means having an upper end and a lower end and its axis of elongation vertically oriented for containing a volume of immiscible fluids and having inlet means, a coalescing element disposed in said coalescer for coalescing the lighter fluids in said coalescer to allow additional separation of said immiscible fluids into a relatively heavier fluid and relatively lighter fluid(s) to form a layered mixture;

means downstream of said container means for withdrawing said relatively heavier fluid from said container means and conveying said relatively heavier fluids to said enclosed coalescer so that additional immiscible fluids are communicated by suction into said first filter means;

means for withdrawing fluid from the upper portion of said coalescer means and conveying said fluid to said elongated container means having said baffled separator means disposed in the interior thereof, intermediate the upper and lower ends thereof;

enclosed volume means having an upper end and a lower end and its axis of elongation vertically oriented for containing a volume of immiscible fluids and containing a filter element having an upstream side and a downstream side for absorption of oil and removal of solids, and having inlet means on the upstream side of said filter element and outlet means on the downstream side of said filter element, means for withdrawing heavier fluid from said coalescer means and conveying said withdrawn fluids to said inlet of said elongated enclosed volume means;

a carbon filter means having an upper end and a lower end and its axis of elongation vertically oriented for containing a volume of immiscible fluids and having inlet means, outlet means, and an activated carbon filter assembly for absorption of oil and removal of solids intermediate said inlet means and said outlet means, and means for conveying fluids from said outlet means of said elongated enclosed volume means and said inlet means of said carbon filter means.

Although the system was first designed for separation of oil and fine solids from water, and thus is particularly suited for reclaiming water which has been contaminated with such impurities, it will be readily apparent that the system is capable of separating other immiscible fluids, so long as the fluids have different densities, and is thus capable of use in a number of other industrial applications. Although this invention has been described in its preferred form with a certain degree of particularity with respect to separation of oil and fine solids from water, it is understood that the present disclosure of the preferred form has been made only by way of example and that numerous changes in the details of structures and the composition of the system may be resorted to without departing from the spirit and scope of the invention.

Now that the invention has been described,
What is claimed is:

1. A system for separating immiscible fluids having different densities, said system comprising:

(a) a first filter assembly comprising a filter housing and a porous filter, said housing having an inlet for receiving a mixture of immiscible fluids from a source of immiscible relatively heavier and lighter fluids and an outlet for discharging filtered fluids;

(b) means for introducing a mixture of immiscible fluids into said inlet of said first filter assembly;

(c) a settling tank for quiescently containing a volume of immiscible fluids of different densities for allowing lighter fluid(s) to rise for removal and heavier fluids to settle for removal;

(d) means for withdrawing filtered fluids from said outlet of said first filter assembly and communicating said fluids to said settling tank;

(e) a second filter assembly comprising a filter housing and a filter, said filter housing having an inlet and an outlet, the porosity of said filter of said second filter assembly being finer than the porosity of the filter of the first filter assembly;

(f) means for withdrawing settled heavier fluids from said settling tank and communicating said heavier fluids to said inlet of said second filter assembly;

(g) a heavy oil gravity separator including a heavy oil gravity separator housing having an inlet, an outlet for relatively heavier fluid, an outlet for relatively lighter fluid(s), whereby the relatively heavier fluid communicated to said separator separates from the relatively lighter fluid(s) concurrently communicated thereto to form a layered mixture of heavier and lighter fluids;

(h) means for withdrawing filtered fluids from said outlet of said second filter assembly and communicating said fluids to said inlet of said heavy oil gravity separator, (i) a light oil coalescer for separation of fluids into a heavier fluid and lighter fluid(s) comprising a coalescer housing having an upper end and a lower end and a coalescer element, said coalescer housing having an inlet, an outlet in communication with said separated heavier fluids, and an outlet in communication with s said separated lighter fluids;

(j) means for withdrawing said separated relatively heavier fluid from said outlet of said heavy oil gravity separator and communicating said relatively heavier fluid to said inlet of said light oil coalescer;

(k) means for withdrawing separated lighter fluids from said light oil coalescer;

(l) an oil separator comprising a separator housing and a separator element for adsorbing oil and filtering solids, said separator housing having an inlet on the upstream side of said replaceable element and an outlet on the downstream side of said replaceable element;

(m) means for communicating said separated heavier fluids from said light oil coalescer to said oil separator.

2. A system as in claim 1, further comprising a carbon filter assembly comprising a carbon filter assembly housing and a carbon filter, said carbon filter assembly housing having an inlet in communication said outlet of said oil separator.

3. A system as in claim 1, wherein said first strainer assembly is a duplex cleanable strainer bag assembly comprising two housings, each housing having one strainer bag of 1–100 porosity.

4. A system as in claim 1, wherein said filter of said first filter assembly has a porosity of 10–50 $\mu$m.

5. A system as in claim 1, including a pump disposed between said heavy oil gravity separator and said light oil coalescer to draw a flow of fluids through said heavy oil gravity separator so that heavier relatively unemulsified immiscible fluids are communicated by suction from said settling tank and said second cleanable strainer bag assembly into said heavy oil separator, and for withdrawing said separated relatively heavier fluid from said outlet of said heavy oil gravity separator and communicating said relatively heavier fluid to said inlet of said light oil coalescer.

6. A system as in claim 1, including means for withdrawing a relatively lighter fluid from the upper portion of said light oil coalescer and communicating said fluid into the inlet of said heavy oil gravity separator.

7. A system as in claim 1, including means for withdrawing separated lighter fluids from the upper region of said settling tank.

8. A System as in claim 1, wherein said relatively heavier fluid is water, said relatively lighter fluid is oil, and said heavy-y oil separator comprises a vertically disposed generally cylindrical tank having an inlet to receive a mixture of water and oily impurities, first outlet means communicating with the lower portion of the tank for discharging the water, second outlet means communicating with the upper portion of the tank for discharging the oily impurities, separator means in said tank and comprising a at least one generally flat plate disposed in said tank in direct alignment with said inlet, said plates being inclined upwardly and away from said inlet and extending upwardly from a level beneath said inlet to a level above said inlet and toward said second outlet means, said plate having an upper edge extending generally cordwise of said tank and having a lower curved edge disposed generally contiguous to the inner surface of said tank, approximately one half of the cross sectional area of the tank throughout the entire height of the tank being unobstructed such that said mixture entering the tank through said inlet is deflected upwardly by said plate and said oily liquid is collected as a layer in the upper end of said tank for discharge through said second outlet means and said water flows downwardly through the unobstructed cross sectional area of said tank for discharge through said first outlet means.

9. A system as in claim 1, wherein said light oil coalescer comprises:
a vessel having an upper portion and a lower portion;
an outlet for removal of eater connected to a lower portion of said vessel;
an outlet for removal of oil connected to an upper portion of said vessel;
an inlet for oily water;
at least one generally cylindrical filter device disposed within said vessel, said filter device having an upper end closed by an upper plate and a lower end closed by a lower plate, said lower plate having an opening in communication with said inlet for oily water.

10. A system as in claim 1, wherein said heavy oil gravity separator further comprises an oil detecting means for detecting the accumulation of a predetermined amount of oil in the upper portion of the chamber to provide an electrical signal and means responsive to said electric signal to control an electromagnetic valve connected to said upper portion to allow discharge of the oil therethrough.

11. A system as in claim 1, wherein said heavy oil gravity separator further comprises an oil detecting means for detecting the accumulation of a predetermined amount of oil in the upper portion of the chamber to provide an electrical signal and means responsive to said electric signal to control an electric pump connected to said upper portion to cause withdrawal of the oil until the amount of oil is reduced to a predetermined minimum.

12. An system as in claim 1, wherein the relatively heavier fluid is water and the relatively lighter fluid(s) is selected from the group consisting of petroleum based oils and petroleum based fuels.

13. A system as in claim 1, including means for withdrawing gas from the interior of said system.

14. A system as in claim 1, wherein said carbon filter is an activated carbon filter.

15. A system as in claim 1, further comprising baffled separator means disposed in the interior of said separator for deflecting the flow of immiscible fluids communicated to said separator.

16. A process for separating impurities from oily water which process comprises, in order:
(a) supplying a mixture of oil and water to a first strainer bag assembly including at least one porous strainer bag;
(b) passing said mixture through at least one porous strainer bag in said first strainer bag assembly;
(c) conveying the mixture treated in step (b) to a settling tank and allowing a fraction of the oil to rise to the top of the tank, a fraction of any solid particulate matter present to settle to the bottom of the tank, and a predominantly water fraction to form in the remainder of the tank;
(d) withdrawing some of the predominantly water fraction obtained in step (c) from said settling tank, conveying it to a second cleanable strainer bag assembly, and passing it through at least one strainer bag in the second strainer bag assembly of a porosity finer than the porosity of the strainer bag of said first cleanable strainer bag assembly;
(e) conveying the product of step (d) to a heavy oil gravity separator for causing oil to separate and rise to the top of the heavy oil gravity separator, and withdrawing oil from the top of the heavy oil gravity separator;
(f) withdrawing fluids from a lower portion of said heavy oil gravity separator and conveying the withdrawn fluids to a light oil coalescer having an element for adsorbing oil and filtering solids to form an oil-rich phase in the upper portion of the light oil coalescer and a water-rich phase in the remainder of the light oil coalescer;
(g) withdrawing oil-rich fluid from the upper portion of the light oil coalescer;
(h) withdrawing water-rich fluid from the light oil coalescer and conveying it to a further oil separator having a filter element for filtering solids and absorbing oil in the filter element; and
(i) conveying the water-rich fluid treated in step (h) to a carbon filter assembly and passing the water rich fluid through the carbon filter.

17. A process as in claim 16, further comprising conveying said fluid withdrawn from the upper portion of the light oil coalescer to an inlet of said heavy oil gravity separator.

18. A process as in clam 16, further comprising withdrawal of settled solids and separated oil from said settling tank.

* * * * *